(12) United States Patent
Ikarashi et al.

(10) Patent No.: US 6,959,995 B2
(45) Date of Patent: Nov. 1, 2005

(54) ILLUMINATING APPARATUS

(75) Inventors: Hideki Ikarashi, Niigata (JP); Masato Obata, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 124 days.

(21) Appl. No.: 10/089,297

(22) PCT Filed: Jun. 20, 2001

(86) PCT No.: PCT/JP01/05288

§ 371 (c)(1),
(2), (4) Date: Mar. 29, 2002

(87) PCT Pub. No.: WO02/10692

PCT Pub. Date: Feb. 7, 2002

(65) Prior Publication Data

US 2002/0135994 A1 Sep. 26, 2002

(30) Foreign Application Priority Data

Jul. 31, 2000 (JP) ........................................ 2000-235256
Mar. 30, 2001 (JP) ........................................ 2001-101382

(51) Int. Cl.$^7$ ............................................. G01D 11/28
(52) U.S. Cl. .............................. 362/23; 362/24; 362/27; 362/555; 362/811; 362/26; 362/29; 362/30; 116/47; 116/48; 116/49; 116/DIG. 6; 116/DIG. 36
(58) Field of Search ............................. 362/23, 24, 27, 362/555, 811, 26, 29, 30, 511, 489; 116/47, 48, 49, DIG. 6, DIG. 36, DIG. 5

(56) References Cited

U.S. PATENT DOCUMENTS

| | | | |
|---|---|---|---|
| 5,319,527 A | * | 6/1994 | Murphy et al. ............... 362/26 |
| 6,276,809 B1 | | 8/2001 | Matsumoto |
| 6,302,551 B1 | * | 10/2001 | Matumoto .................. 362/27 |

FOREIGN PATENT DOCUMENTS

| | | |
|---|---|---|
| JP | 54-148160 | 10/1979 |
| JP | 6-331394 | 12/1994 |
| JP | 7-55511 | 3/1995 |
| JP | 9-280904 | 10/1997 |
| JP | 10-505678 | 6/1998 |
| JP | 2000-205897 A | 7/2000 |
| JP | 2001-74511 | 3/2001 |
| WO | WO 96/08696 | 3/1996 |

* cited by examiner

Primary Examiner—Stephen Husar
Assistant Examiner—Bertrand Zeade
(74) Attorney, Agent, or Firm—McDermott Will & Emery LLP

(57) ABSTRACT

The present invention provides an illuminating apparatus capable of carrying out an illumination operation excellently by guiding the light from light sources to an illuminating member efficiently, and having a low price. The illuminating apparatus is provided with a pointer 2 adapted to be turned around a rotary shaft 1, a dial 3 positioned on a rear side of the pointer 2 and constituting a display member to be transmission illuminated, light-emitting diodes 6 positioned on a rear side of the dial 3 and in the vicinity of the rotary shaft 1 and constituting light sources for illuminating index portions 13 of the dial 3, a case 20 positioned on the rear side of the dial 3 and constituting a reflector provided with a reflecting portion 30, and a light guide member 19 positioned on the rear side of the dial 3 and adapted to guide the light from the light-emitting diodes 6 to the rear side of the dial 3. A hollow portion 29 is formed between a rear surface of the dial 3 and case 20, and an irradiation portion 27 adapted to apply the light to the interior of the hollow space 29 is provided on the light guide member 19, the light from the light-emitting diodes 6 being applied from the irradiation portion 27 of the light guide member 19 to the interior of the hollow portion 29, reflected on the reflecting portion 30 and illuminating the index portions 13 of the dial 3.

6 Claims, 6 Drawing Sheets

ILLUMINATING APPARATUS

TECHNICAL FIELD

This invention relates to an illuminating apparatus adapted to illuminate object members by using a light guide member.

BACKGROUND ART

The related art illuminating apparatuses include, for example, illuminating apparatuses shown in FIGS. 10 to 12.

The illuminating apparatus shown in FIG. 10 is provided with a pointer 52 adapted to be turned around a rotary shaft 51, a dial 53 constituting a display member positioned at the rear side (lower side in the drawing) of this pointer 52 and transmission illuminated, a hard circuit board 54 positioned at the rear side (lower side in the drawing) of this dial 53 and formed of a glass epoxy resin, light-emitting diodes 55, 56 provided on this circuit board 54 and serving as light sources for illuminating the pointer 52 and dial 53 respectively, a cylindrical partition 57 defining regions to be illuminated by the light-emitting diodes 55, 56 respectively, and a meter body 58 fixed to the rear side (lower side in the drawing) of the circuit board 54 and adapted to turn the rotary shaft 51.

In the point r 52, an indicating member 59 and a pointer base portion 60 fixed to the rotary shaft 51 are formed in on body out of a transparent synthetic resin, and the pointer base portion 60 is covered with a pointer cap 61 made of a light shielding synthetic resin. The indicating member 59 receives the light from the light-emitting diodes 55 and emits the light.

The dial 53 is formed of a flat base material 62 of a transparent synthetic resin, which is provided on an outer surface (upper surface in the drawing) thereof except index portions 63 having a graduation, letters and the like with a light shielding layer 64 of a black light shielding coating material forming a ground of the dial 53, and on a rear surface (lower surface in the drawing) thereof except the index portion 63 having the graduation, letters and the like with a light shielding reflecting layer 65 of a white light shielding coating material. Therefore, this illuminating apparatus has a structure in which the index portions only 63 are transmission illuminated.

The light-emitting diodes 55, 56 are surface mounting type light-emitting diodes, and the light-emitting diodes 55 are provided plurally along an imaginary circle in the vicinity of and extending around and coaxially with the rotary shaft 51. The light-emitting diodes 56 are provided plurally on a circle around the rotary shaft 51 on the portion of the circuit board which is just under the index portions 63. The partition 57 is made of a synthetic resin, and adapted to define regions to be illuminated, in such a manner that the rays of light sent out from the diodes 55, 56 are not mixed with one another.

This related art example is formed so that the index portions 63 are transmission illuminated directly by the light-emitting diodes 56 positioned just thereunder.

Since this illuminating apparatus is formed so that the index portions 63 are transmission illuminated by the light-emitting diodes 56, it is difficult that the number of the light-emitting diodes 56 be reduced for the purpose of preventing the unevenness of the transmission illumination of the index portions 63 from occurring. Therefore, there is a limit to the reduction of the manufacturing cost. Since the index portions 63 are usually provided in a circumferential portion of the dial 53, it is necessary that the light-emitting diodes 56 opposed to the index portions 63 be also away from the pointer illuminating diodes 55. This causes a pattern (not shown) of conductors provided on the circuit board 54 to become complicated, and renders the designing of the illuminating apparatus difficult.

Other related art illuminating apparatuses designed so as to eliminate these inconveniences include the illuminating apparatus shown in FIG. 11. In this drawing, the portions identical with or corresponding to those in the previously-described related art illuminating apparatus will be designated by the same reference numerals and a detailed description thereof will be omitted.

The related art illuminating apparatus of FIG. 11 is provided with light-emitting diodes 56 provided in the vicinity of a partition 57, a reflecting wall 66 formed on the partition 57, and a reflector 67 positioned on a rear surface of a dial 53 just under, especially, index portions 63.

The light-emitting diodes 56 are provided plurally on a circle in the vicinity of the and partition 57 extending around a rotary shaft 51.

The reflecting wall 66 is made integral with the partition 57, and positioned above the light-emitting diodes 56. The reflecting wall 66 is conically shaped, and adapted to reflect the light, which is sent out from the light-emitting diodes 56, radially with respect to the rotary shaft 51 as the center toward the reflector 67.

The reflector 67 is made of a synthetic resin, and a reflecting surface 68 thereof has a curved cross-sectional shape so as to have the light, which has been reflected on the reflecting wall 66, reflected excellently on a rear surface of a dial 53.

This related art example is formed so that the light from the light-emitting diodes 56 is reflection diffused at the reflecting wall 66 and reflecting surface 68 or at a circuit board 54, partition 57, a light shielding reflecting layer 65, reflecting wall 66 and a reflecting surface 68 to transmission illuminate index portions 63.

This illuminating apparatus has a loss of the quantity of light, and the reduction of the number of the light sources is not expected much since the luminance of the index portions 63 has to be secured, the reduction of the manufacturing cost being thereby limited.

Still other related art illuminating apparatuses designed so as to eliminate these inconveniences include an illuminating apparatus shown in FIG. 12. In this drawing, the portions identical with or corresponding to those of each of the previously-described related art illuminating apparatuses will be designated by the same reference numerals, and the detailed description thereof will be omitted.

This related art example is provided with a light guide member 69 positioned between a dial 53 and a circuit board 54 and adapted to guide the light sent out from light-emitting diodes 56 to index portions 63, and a white synthetic resin case 70 supporting this light guide member 69.

The light guide member 69 is a part for guiding the light from the light-emitting diodes 56 to the index portions 63, and adapted to receive the light at a light receiving portion 71 and reflect the light which has passed through the interior of the light guide member 69 on a reflecting surface 72, the reflected light being guided to the rear side of the dial 53 which corresponds to the index portions 63 to transmission illuminate the index portions 63. The reflecting surface 72 is provided with a whit print layer (not shown) so as to excellently reflection diffuse the light and guide the resultant light to the index portions 63. When the light guide member 69 is thus used, the index portions 63 can be transmission illuminated without causing a loss of the quantity of light to occur until the light reaches the index portions.

The light guide member 69 is provided with a locking claw 73, while the case 70 is provided with a hole 74 opposed to the locking claw 73. The light guide member 69 is fixed to the case 70 by inserting the locking claw 73 through the hole 74 and engaging the locking claw with a rear surface of the case 70.

However, since a large light guide member 69 is needed in this illuminating apparatus, the weight of the apparatus increases. Since the light cannot be excellently reflection diffused at the reflecting surface 72 of the light guide member 69 toward the index portions 63, the white print layer mentioned above is provided thereon. In order to form the white print layer on the reflecting layer, inexpensive screen printing cannot be utilized since the light guide member 69 is provided with a projection, such as the light receiving portion 71, etc. Therefore, an expensive hot stamp has to be used, and this causes the manufacturing cost to increase.

The present invention has been mad in view of these circumstances, and provides an inexpensive illuminating apparatus capable of excellently illuminating object members by efficiently guiding the light from light sources thereto.

DISCLOSURE OF THE INVENTION

The illuminating apparatus according to the present invention is provided with a pointer 2 adapted to be turned around a rotary shaft 1, a dial 3 constituting a display member, positioned at a rear side of the pointer 2 and adapted to be transmission illuminated by the light, light-emitting diodes 6 positioned at a rear side of the dial 3 and in the vicinity of the rotary shaft 1 and constituting light sources for illuminating index portions 13 of the dial 3, a case 20 constituting a reflector, positioned on a rear side of the dial 3 and having a reflecting portion 30, and a light guide member 19 positioned on a rear side of the dial 3 and adapted to guide the light from the light-emitting diodes 6 to the rear side of the dial 3, a hollow portion 29 being formed between a rear surface of the dial 3 and an inner surface of the case 20, the light guide member 19 being provided with an irradiation portion 27 adapted to apply the light to the interior of the hollow portion 29, the light from the light-emitting diodes 6 being thereby applied from the irradiation portion 27 of the light guide member 19 to the interior of the hollow portion 29, the resultant light being reflected on the reflecting portion 30 and illuminating the index portions 13 of the dial 3 therewith. Since the illuminating system is thus formed, the light from the light-emitting diodes 6 can be guided efficiently to the index portions 13 of the dial 3, and the index portions can be excellently illuminated. Since the light is reflected on the reflecting portion 30, the light guide member 19 may not be provided with a white print layer, so that an inexpensive illuminating apparatus can be provided.

The illuminating apparatus according to the present invention is provided with a pointer 2 constituting a first member illuminated by light-emitting diodes 5 constituting first light sources, index portions 13 constituting second members illuminated by light-emitting diodes 6 constituting second light sources, a first light guide member 16 positioned at a rear side of the pointer 2 and adapted to guide the light from the light-emitting diodes 5 to the pointer 2, and a second light guide member 19 positioned at the rear side of the index portions 13 and adapted to guide the light from the light-emitting diodes 6 to the index portion 13, the first light guide member 16 and second light guide member 19 being connected together in one body by a joint portion 33. Since the light guide members 16, 19 for illuminating different objects, i.e. the pointer 2 and index portions 13 are thus made integral with each other, a lighting system capable of reducing the number of parts and improving a fixing efficiency can be provided.

The first light guide member 16 and second light guide member 19 are separated from each other by a partition 7 constituting a partitioning member, and the connecting member 33 is provided in a position opposed to a portion in which index portions 13 constituting portions to be transmission illuminated are not provided. Owing to such an arrangement, it is possible when the illumination colors for the pointer 2 and index portions 13 are different to provide an illuminating apparatus capable of illuminating object members without exerting influence upon the illumination colors.

The reflecting portion 30 has a curved cross-sectional shape. Since the reflecting portion is thus formed, the light from the light-emitting diodes 6 can be reflection diffused on the reflecting portion 30 with a higher efficiency, and the object members can be excellently illuminated.

The reflecting portion 30 has a cross-sectional shape obtained by forming a plurality of flat surfaces continuously at various angles. Owing to such an arrangement, the light from the light-emitting diodes 6 can be reflection diffused on the reflecting portion 30 with a higher efficiency, and the object members can be illuminated excellently.

BEST MODE FOR CARRYING OUT THE INVENTION

The illuminating apparatus according to the present invention will now be described on the basis of what are shown in the attached drawings taking as an example a case where the illuminating apparatus is employed in a vehicular meter using a pointer.

Figure 1:
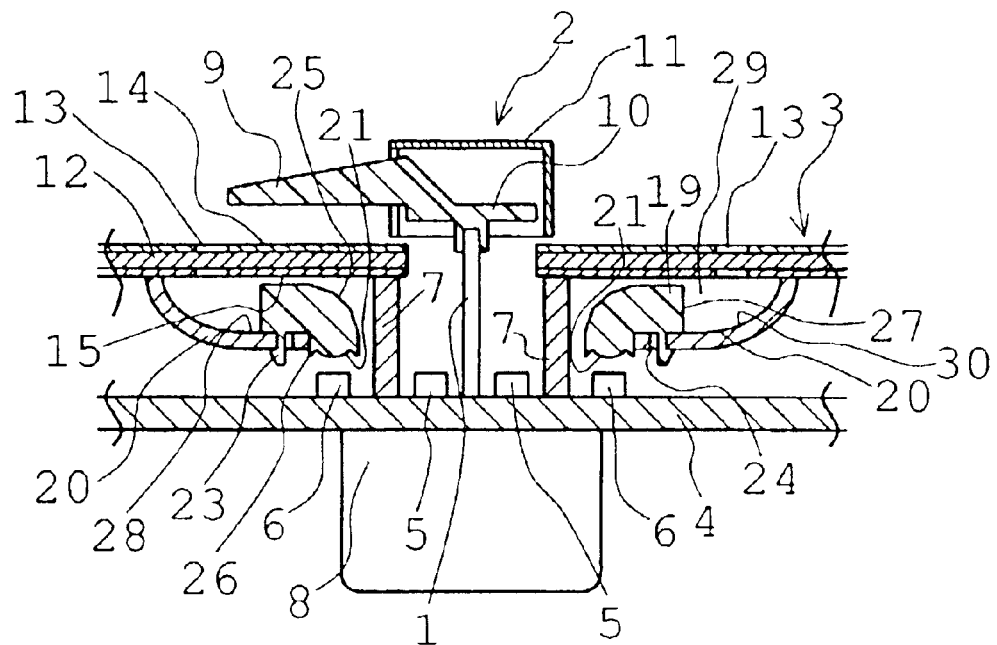
FIG. 1 is a sectional view of the illuminating apparatus in a first embodiment of the present invention.

A meter employing the illuminating apparatus according to the present invention is provided with a pointer 2 adapted to be turned around a rotary shaft 1, a dial 3 positioned at a rear side (lower side in FIG. 1) of the pointer 2 and constituting a display member adapted to be transmission illuminated, a hard circuit board 4 positioned at a rear side (lower side in FIG. 1) of the dial 3 and made of a glass epoxy resin, light-emitting diodes 5, 6 constituting light sources for illuminating the pointer 2 and dial 3 respectively, a cylindrical partition 7 defining regions illuminated by the light-emitting diodes 5, 6 respectively, a meter body 8 adapted to rotate the rotary shaft 1 fixed to a rear side of the circuit board 4, a light guide member 19 adapted to condense the light from the light-emitting diodes 6 therein, and a case 20 supporting the light guide member 19 and constituting a reflector.

In the pointer 2, an indicating portion 9 and a pointer base portion 10 fixed to the rotary shaft 1 are made integral with each other of a transparent synthetic resin, and the indicator base portion 10 is covered with a pointer cap 11 formed of a light shielding synthetic resin. The indicating portion 9 is a part adapted to receive the light from the light-emitting diodes 5 and send out light therefrom.

The dial 3 is provided at a front side (upper side in FIG. 1) thereof except the indicating portion 13 including letters and graduations thereon with a light shielding layer 14 of a dark color (black in this embodiment) formed of light shielding ink, so that the light does not permeate through the dial except the index portions 13 thereof. A rear side portion (lower side portion in FIG. 1) except the index portions 13, which constitute portions to be transmission illuminated including letters, graduations and the like, of the dial 3 is provided with a light shielding reflecting layer 15 of a white ink. Although the light shielding reflecting layer 15 in this embodiment has a white color, the color of this layer is not limited thereto. The light shielding reflecting layer may have any color as long as the color is suitable for reflecting the light. For example, a metallic color, such as a silver color and the like meet the purpose.

The light-emitting diode 5, 6 are surface mounting type light-emitting diodes, and the light-emitting diodes 5 are provided on an imaginary circle extending in the vicinity of and around and coaxially with the rotary shaft 1. The light-emitting diodes 6 are provided plurally on an imaginary circle extending on an outer side of the light-emitting diodes 5 and around and coaxially with the rotary shaft 1. The partition 7 is made of a synthetic resin, and defines illumination regions so that the rays of light from the light-emitting diodes 5, 6 are not mixed with each other.

The meter body 8 is fixed to a rear surface (lower side in FIG. 1) of the circuit board 4, and adapted to drive the pointer 2 via the pointer shaft 1. The meter body in this embodiment is a cross coil type meter body which has heretofore been known well. Instead of the cross coil type meter body, a stepping motor may be used.

The light guide member 19 is positioned between the dial 3 and circuit board 4 and made of a light permeable synthetic resin, such as polycarbonate, acrylic resin and the like. Especially, the light guide member in this embodiment is colorless. The light guide member 19 is doughnut-shaped, in a central portion of which the partition 7 and rotary shaft 1 are positioned. Since the index portions 13 are provided on the dial 3 not over the whole circumference thereof, the light guide member 19 provided so as to transmission illuminate the index portions 13 does not have a break-less doughnut shape. The light guide member 19 is partly broken, i.e., it has a C-shaped body.

The light guide member 19 is provided with a light receiving portion 21 adapted to receive the light from the light-emitting diode 6, and a reflecting surface 25 adapted to reflect the light received at the light receiving portion 21 and send the reflected light toward a reflecting portion of a case 20 which will be described later. The light receiving portion 21 has a convex semicircular cross section so that the light receiving portion 21 can efficiently receive the light from the light-emitting diode 6. The light receiving portion 21 is provided with projections 26 on both sides of the convex portion 21. Since these projections 26 are provided so as to cover the light-emitting diodes 6, the light from the light-emitting diodes 6 can be taken into the light guide member 19 with the highest possible percentage. The light receiving portion 21 is formed so as to project at only the portions thereof that are opposed to the light-emitting diodes 6, and toward the same diodes 6. The reflecting surface 25 is formed of a plurality of flat surfaces so as to reflect the light, which has received at the light receiving portion 21, without any light receiving loss, the reflecting surface 25 in this embodiment being provided with three reflecting surfaces 25a, 25b, 25c. The number of the reflecting surfaces 25 may be set arbitrarily or suitably. In a certain case, the reflecting surface 25 may have a curved cross-sectional shape. A reference numeral 27 denotes an irradiation portion from which the light in the light guide member 19 is applied to the reflecting portion, and the irradiation portion in this embodiment has a vertically extending cross-sectional shape.

The light guide member 19 is provided with a locking claw 23, and the case 20 (is provided) a hole 24 opposed to the locking claw 23. The light guide member 19 is fixed to the case 20 by inserting the locking claw 23 through the hole 24 and engaging the same with a rear surface of the case 20.

Figure 2:
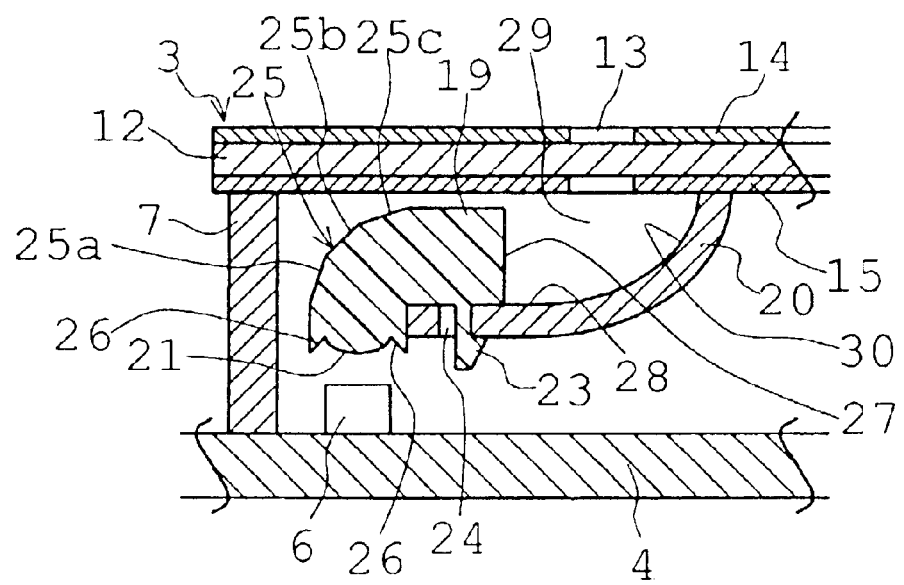
FIG. 2 is an enlarged sectional view of a principal portion of the same embodiment.
Figure 3:
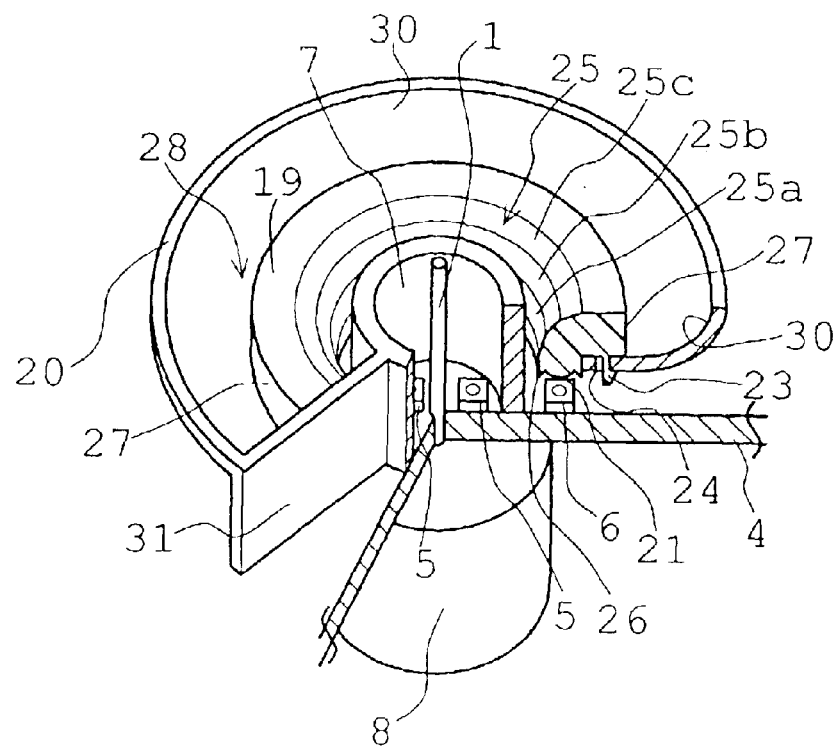
FIG. 3 is a sectioned perspective view of the same embodiment.
Figure 4:
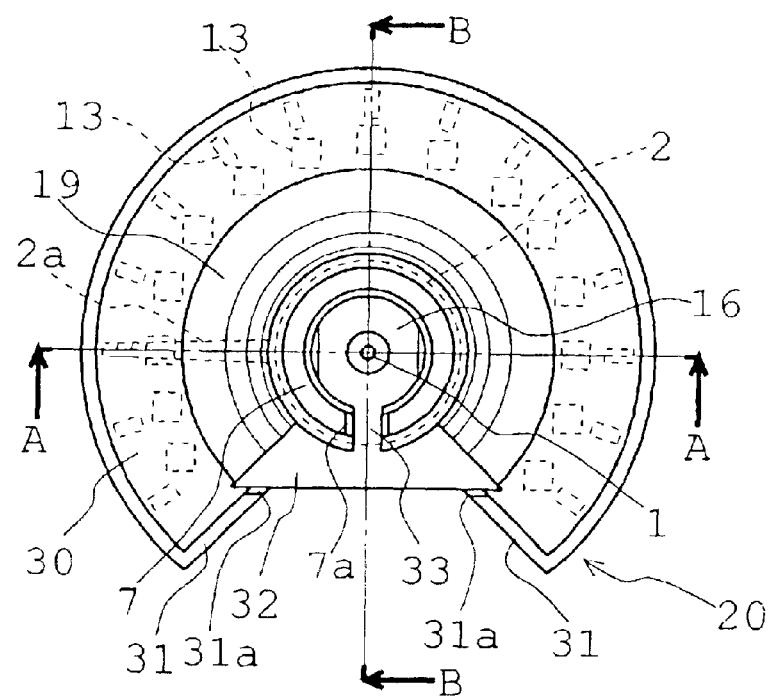
FIG. 4 is a front view of the illuminating apparatus in a second embodiment of the present invention.
Figure 5:
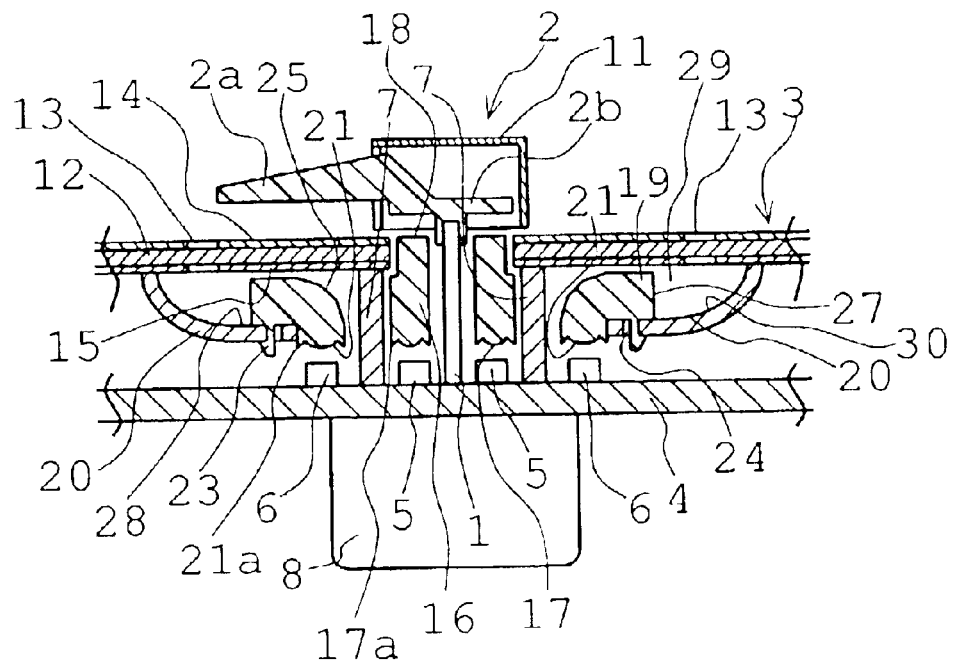
FIG. 5 is a sectional view taken along the line A—A in FIG. 4.
Figure 6:
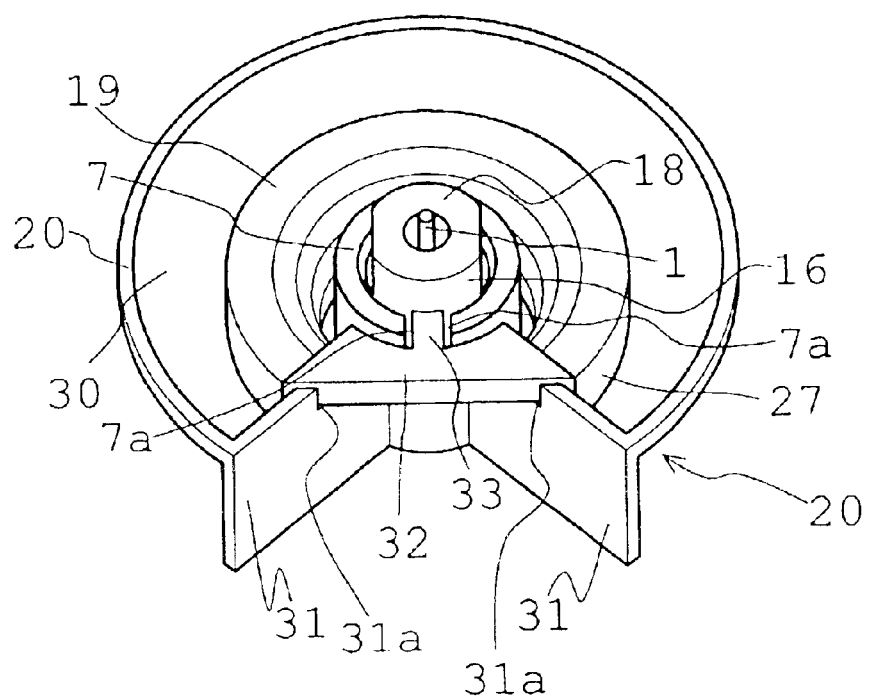
FIG. 6 is a perspective view of a principal portion of the same embodiment.
Figure 7:
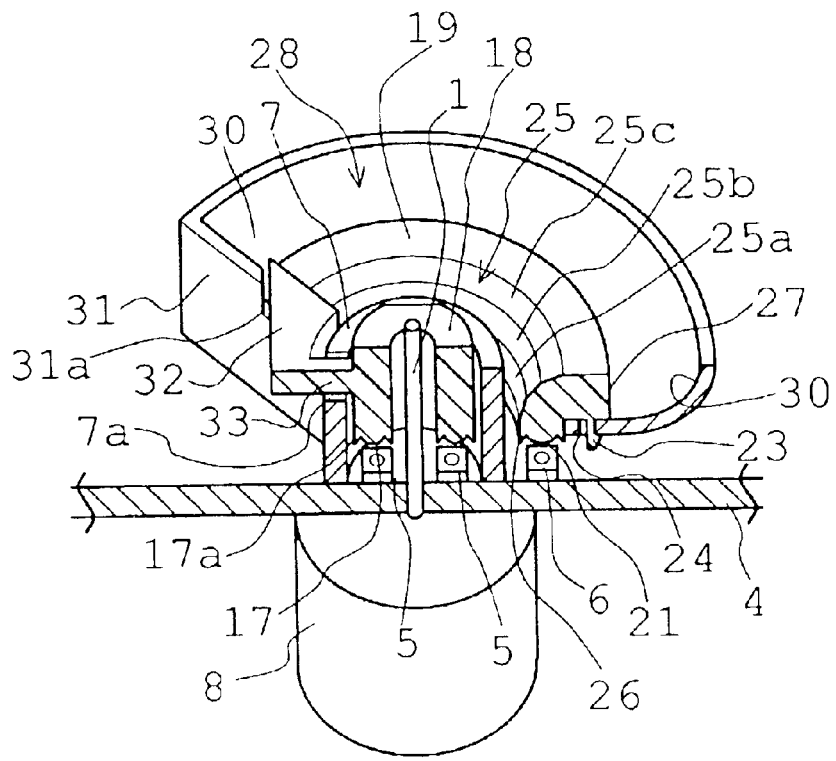
FIG. 7 is a partially sectioned perspective view taken along the line B—B in FIG. 4.

The case 20 is positioned on a rear surface (lower side in FIG. 1) of the dial 3, and made integral with the partition 7 and of a white synthetic resin. The case 20 is provided with a storage recess 28 in which the light guide member 19 is held, and this storage recess 28 also has a C-shaped structure just as the light guide member 19. Owing to the storage recess 28, a hollow portion 29 is formed between the dial 3 and case 20. The case 20 is curved at a circumference thereof in the upward direction (in FIG. 1 and FIG. 2) in a downwardly recessed manner, and provided at an inner surface thereof with a reflecting portion 30 adapted to reflection diffuse the light from the light guide member 19 thereon and toward the index portions 13. Since the reflecting portion 30 has a curved cross-sectional shape, the reflected light can be reflection diffused toward the index portions 13 without losing the light. Referring to FIG. 3, a reference numeral 31 denotes walls for defining the storage recess 28 and connecting the storage recess 28 and partition 7 together.

A method of illuminating this embodiment will now be described. The light sent out from the light-emitting diodes 6 enters the interior of the light guide member 19 via the light receiving portion 21 thereof, and is reflected rightward in FIG. 2 on the reflecting surface 25, the resultant light being applied from the irradiation portion 27 to the interior of the hollow portion 29. The light thus applied to mentioned portion is reflection diffused on the reflecting portion 30, and the index portions 13 are thereby transmission diffused.

Owing to this arrangement, excellent illumination of the index portions can be carried out by introducing the light from the light-emitting diodes 6 into the hollow portion 30 by the light guide member 19 without losing the light, and reflection diffusing the light which has been applied to the hollow portion on the reflecting portion 30. The index portions 13 can also be illuminated excellently by repeatedly carrying out the reflection diffusing of the light applied to the hollow portion 29 by the case 20 including the reflecting portion 30 and the light shielding reflecting layer 15.

Since the light guide member 19 is formed not so as to reach a region opposed to the index portions 13 but so as to extend up to a region just before the reflecting portion 30, the light guide member 19 can be made compact, and the weight thereof can be reduced. Since the light is reflected on the reflecting portion 30 of the case 20, it becomes unnecessary unlike the light guide member in a related art illuminating apparatus to form a white print layer on the light guide member 19, so that excellent illumination of the index portions can be carried out with the manufacturing cost reduced.

In this embodiment, the light-emitting diodes 5, 6 are provided in the vicinity of the rotary shaft 1, and this enables the designing of the conductor pattern on the circuit board 4 to be done easily. In the case of a meter in which a pointer 2 does not need to be illuminated, it is not necessary to provide the light-emitting diodes 5. In such a case, a structure in which only the light-emitting diodes 6 specially used for the index portions 13 are provided may be employed. The shape of the reflecting portion 30 is not limited to that thereof in the above-described embodiment. For example, the reflecting portion 30 may be provided by continuously forming a plurality of flat surfaces at various angles just as the reflecting surface 25 of the light guide member 19.

A second embodiment of the present invention will now be described on the basis of what are shown in FIG. 4 to FIG. 7. The portions identical with and corresponding to those of the previously described embodiment will be designated by the same reference numerals, and the detailed description thereof will be omitted.

A meter employing the lighting system according to the present invention is provided with a pointer 2 constituting a first portion to be illuminated, and adapted to be turned around a rotary shaft 1, a dial 3 positioned on a rear side (lower side in FIG. 5) of this pointer 2 and constituting a display member provided with index portions 13 forming second portions to be illuminated, a first light guide member 16 adapted to guide the light from light-emitting diodes 5 to the pointer 2, a second light guide member 19 adapted to guide the light from light-emitting diodes 6 to the index portions 13 of the dial 3, and a case 20 for supporting the first and second light guide members 16, 19.

The dial 3 constituting a display member is provided on a front side (upper side in FIG. 5) thereof except the index portions 13 forming a second portion to be illuminated, such as letters, graduations and the like with a light shielding layer 14 of a dark color formed of light shielding ink. The dial 3 is provided on a rear side (lower side in FIG. 5) thereof except the index portions 13 with a light shielding layer 15 formed of ink of a white color.

The first light guide member 16 is positioned between the pointer 2 and a circuit board 0.4 and formed of a light permeable synthetic resin, such as polycarbonate, an acrylic resin and the like, the resin used in this embodiment being colorless in particular. The first light guide member 16 is of a substantially cylindrical shape. In a hole extending through a central portion of the first light guide member 16, the rotary shaft 1 is positioned. The first guide member 16 is provided with a light receiving portion 17 adapted to receive the light from the light-emitting diodes 5, and an irradiation portion 18 adapted to send out the light received by the light receiving portion 17 to the pointer 2. The light receiving portion 17 has a convex semicircular cross-sectional shape so that the light receiving portion 17 can efficiently receive the light from the light-emitting diode 5. The light receiving portion is provided with projections 17a in the vicinity of both sides of the convex surface thereof. Since the projections 17a are provided so as to cover the light-emitting diodes 5, the light from the light-emitting diodes can be taken into the first light guide member 16 so that the light from the light-emitting diodes 5 is lost to as small an extent as possible. The light receiving portion 17 is formed on the portion only that is opposed to the light-emitting diodes 5 so as to project toward the light-emitting diodes 5.

The second light guide member 19 is positioned between the dial 3 and circuit board 4, and formed of a light permeable synthetic resin, such as polycarbonate, an acrylic resin and the like just as the first light guide member 16, and this guide member is colorless. The second light guide member 19 is doughnut-shaped, and the index portions 13 on the dial 3 are provided not over the whole circumference thereof (refer to FIG. 4). Accordingly, the second light guide member 19 provided so as to transmission illuminate the index portions 13 is not in the shape of a break-less doughnut either. The second light guide member is C-shaped, in which both sides of an opened portion of this C-shaped body are connected together by a flat plate type joint portion 32.

The second light guide member 19 is a part for guiding the light from the light-emitting diodes 6 to the index portions 13, and provided just as the light guide member 19 in the above-described first embodiment with a light receiving portion 21 adapted to receive the light from the light-emitting diodes 6, a reflecting surface 25 adapted to reflect the light received by the light receiving portion 21 and directed to a reflecting portion of a case 20 which will be described later, and an irradiation portion 27 adapted to send out the light in the light guide member 19.

The first light guide member 16 and second light guide member 19 are formed in one body by connecting them together by a joint portion 33. This joint portion 33 is connected to an outer circumferential surface of the first light guide member 16 and joint portion 32 of the second light guide member 18.

The case 20 is positioned on a rear surface (lower side in FIG. 5) of the dial 3, and made of a white synthetic resin and integral with a partition 7. The case 20 is provided with the partition 7 for storing the first light guide member 16 therein, and a storage recess 28 for holding the second light guide member 19 therein. This storage recess 28 is also C-shaped just as the second light guide member 19. Owing to this storage recess 28, a hollow portion 29 is formed between the dial 3 and case 20. A circumference of the storage recess 28 is curved upward in FIG. 5, and an inner surface thereof is provided with a reflecting portion 30 for reflection diffusing the light from the second light guide member 19 toward the index portions 13. Since the reflecting portion 30 is formed so as to have a curved cross section, the reflected light can be reflection diffused toward the index portions 13 without a loss of light. Walls 31 are provided with recesses 31a in which the joint portion 32 is positioned, and the partition 7 a recess 7a in which the joint portion 33 is positioned.

A method of illuminating this embodiment will now be described. The light sent out from the light-emitting diodes 5 enters the first light guide 16 via the light receiving portion 17 of the first light guide member 16, and the resultant light is sent out from the irradiation portion 18 toward the pointer 2. The pointer 2 which has received the light is illuminated at an indicating portion 2a thereof by the light which has entered the interior of the pointer 2. The light from the light-emitting diodes 6 advances from the light receiving portion 21 of the light guide member 19 in the upward direction in FIG. 5, and enters the interior of the light guide member 19. The resultant light is reflected on the reflecting surface 25 in the circumferential direction, and then sent out from the irradiation portion 27 into the hollow portion 29. The light thus sent out from the irradiation portion is reflection diffused on the reflecting portion 30 to transmission illuminate the index portions 13.

Therefore, the index portions 13 can be excellently illuminated by guiding the light from the light-emitting diodes 6 into the hollow portion 29 by the second light guide member 19 without a loss of light, and reflection diffusing the light, which has been sent out from the second light guide member 19, on the reflecting portion 30. The index portions 13 can also be illuminated excellently by repeatedly reflection diffusing the light, which has been applied to the interior of the hollow portion 29, on the case 20 including the reflecting portion 30 and the light shielding reflecting layer 15.

Since the first light guide member 16 and second light guide member 19 are thus formed in one body, the number of parts can be reduced. The attainment of the reduction of the number of parts enables the manday of the fixing operations to be reduced, so that the efficiency of the fixing operations can be improved. The first light guide member 16 for illuminating the pointer is a small part by itself. However, since the first guide member 16 is combined in one body with the second light guide member 19, the resultant light guide member comes to have such dimensions that enable the same part to be handled easily. This point also serves to improve the efficiency of the fixing operations.

In this embodiment, the light-emitting diodes 5, 6 are provided in the vicinity of the rotary shaft 1, so that the designing of the conductor pattern on the circuit board 4 can be done easily.

The first light guide member 16 and second light guide member 19 are separated by the partition 7, and the joint portion 33 for connecting these light guide members 16, 19 is provided in a position opposed to a portion in which the index portions 13 of the dial 3 are not provided. Therefore, for example, even when the pointer 2 and index portions 13 are illuminated by the light of different colors, the illumination colors are not seen mixed since the part of the dial 3 in which the illumination colors are mixed is covered with a ground color portion 14 thereof. Namely, even when different illumination colors are used, the dial and index portions can be illuminated excellently.

The first portion to be illuminated and the second portion to be illuminated are not limited to the pointer 2 and the index portions 13 of the dial 3. The portions to be illuminated may be, for example, a combination of index portions of a dial and an alarm display portion, for example, indications of a seat belt alarm and a turn signal provided in the vicinity of a circumferential portion of the dial. Even this modified example of the present invention can obtain the effects identical with those of the above-described embodiments thereof.

Figure 8:
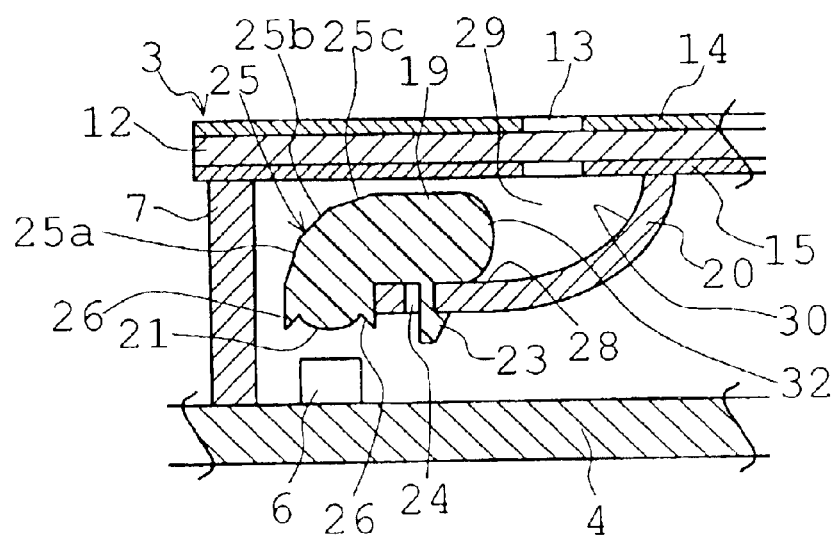
FIG. 8 is an enlarged sectional view of a principal portion of a third embodiment of the present invention.
Figure 9:
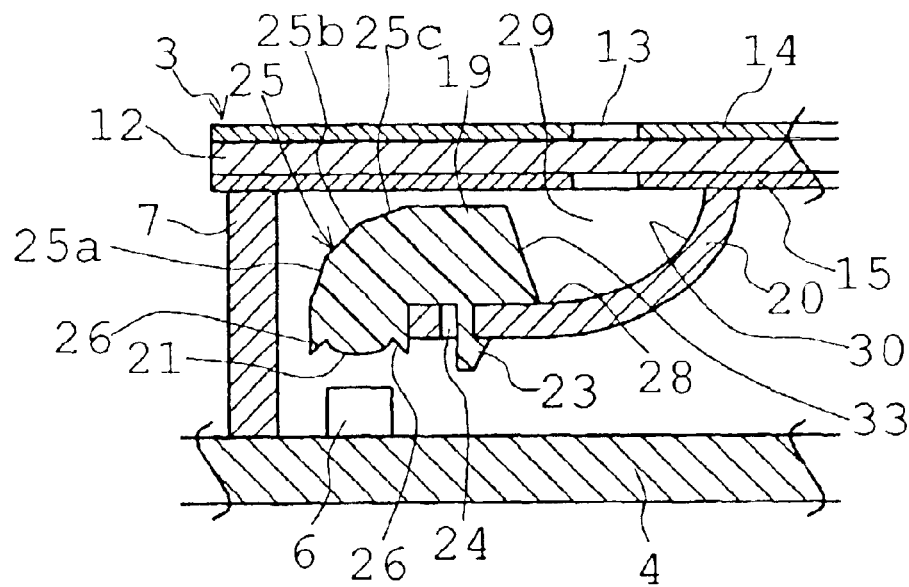
FIG. 9 is an enlarged sectional view of a principal portion of a fourth embodiment of the present invention.
Figure 10:
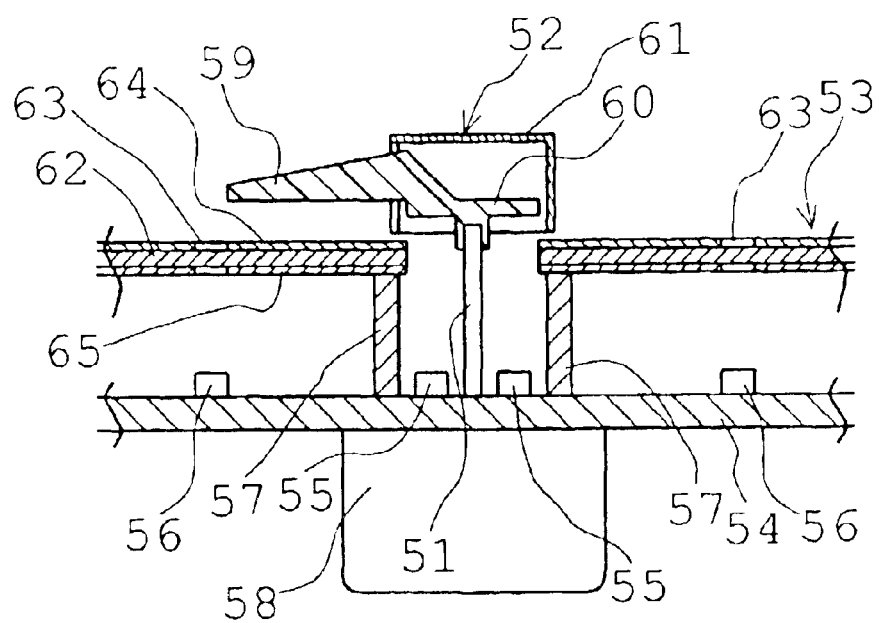
FIG. 10 is a sectional view of a related art example.
Figure 11:
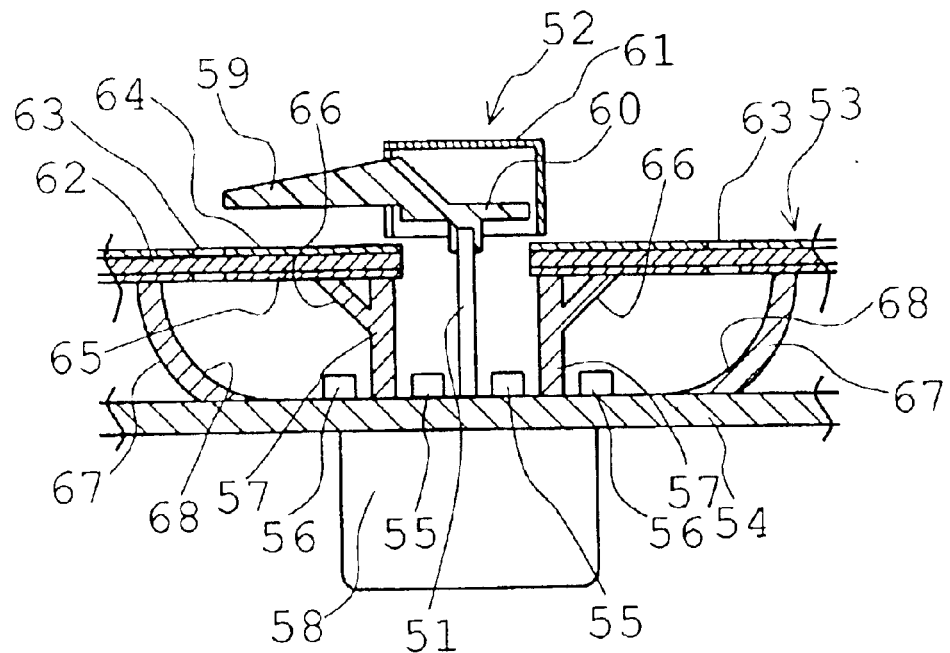
FIG. 11 is a sectional view of another related art example.
Figure 12:
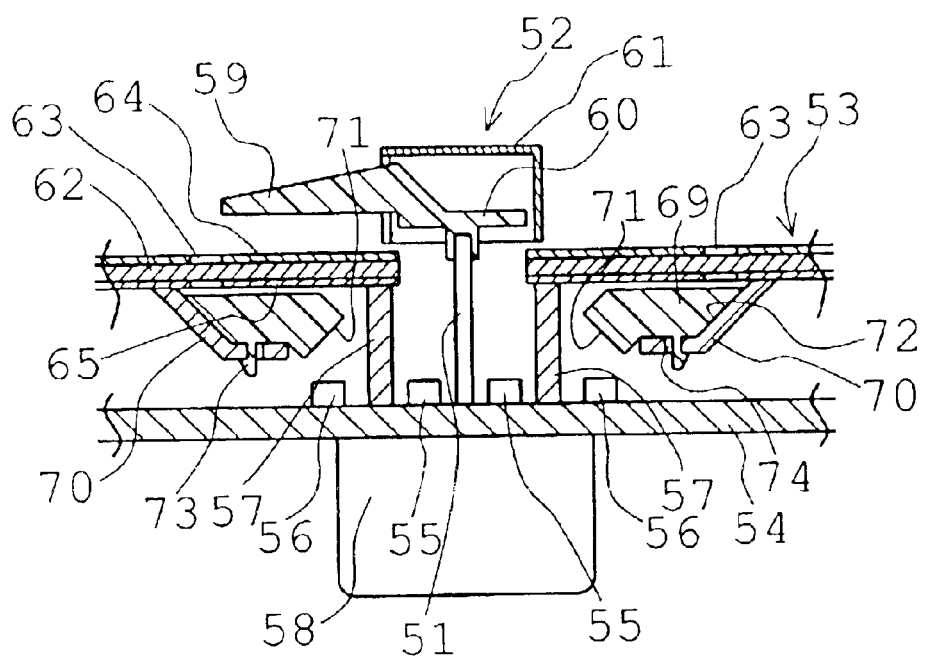
FIG. 12 is a sectional view of still another related art example.

Although the irradiation portion 27 in each of the above-described embodiments extends vertically in cross section, this shape is not limited to that employed in these embodiments. As in an apparatus shown in FIG. 8 as a third embodiment, the cross-sectional shape of an irradiation portion 32 may be arcuate, in which the irradiation portion 32 is formed so as to project toward a hollow portion 29. As in an apparatus shown in FIG. 9 as a fourth embodiment, the cross-sectional shape of an irradiation portion 33 may be inclined. Owing to these structures, the index portions 13 can be illuminated in a more improved manner by controlling the light applied to the interior of the hollow portion 29. Namely, the index portions 13 can be illuminated by condensing the light, which is applied to the interior of the hollow portion, to the portion at which the reflecting portion 30 can be illuminated excellently, so that the index portions 13 can be illuminated in a more improved manner.

INDUSTRIAL APPLICABILITY

The present invention can be utilized as an illuminating apparatus for illuminating object members by using light guide members, especially, as an illuminating apparatus for a vehicular meter using a pointer.

What is claimed is:

1. An illuminating apparatus comprising:
    a pointer adapted to be turned around a rotary shaft,
    a display member positioned on a rear side of the pointer and adapted to be transmission illuminated,
    light sources positioned on a rear side of the display member and in the vicinity of the rotary shaft and adapted to illuminate the display member,
    a reflector positioned on the rear side of the display member and provided with a reflecting portion, and
    a light guide member positioned on the rear side of the display member and adapted to guide the light from the light sources to the rear side of the display member, characterized in that a hollow portion is formed between a rear surface of the display member and reflector, and
    an irradiation portion of the light guide member is adapted to apply the light, which is reflected on the reflecting portion and illuminates the display member, to the interior of the hollow portion being provided on the light guide member.

2. An illuminating apparatus having a pointer adapted to be rotated around a rotary shaft, a display member positioned on a rear side of the pointer and provided with a portion to be transmission illuminated, first light sources positioned on the rear side of the pointer and adapted to illuminate the pointer, second light sources positioned on a rear side of the display member and adapted to illuminate the portion to be transmission illuminated, a first light guide member adapted to guide the light from the first light sources to the pointer, and a second light guide member positioned on the rear side of the display member and adapted to guide the light from the second light sources to the rear side of the display member, characterized in that the first light guide member and second light guide member are formed in one body.

3. A lighting system having a pointer adapted to be turned around a rotary shaft, a display member positioned on a rear side of the pointer and provided with a portion to be transmission illuminated, first light sources positioned on the rear side of the pointer and adapted to illuminate the pointer, second light sources positioned on a rear side of the display member and adapted to illuminate the portion to be transmission illuminated, a first light guide member adapted to guide the light from the first light sources to the pointer, a second light guide member positioned on the rear side of the display member and adapted to guide the light from the second light sources to the rear side of the display member, and a reflector positioned on the rear side of the display member and provided with a reflecting portion, characterized in that a hollow portion is formed between a rear surface of the display member and reflector, an irradiation portion adapted to apply the light, which is reflected on the reflecting portion and illuminates the display member, to the interior of the hollow portion being provided on the light guide members, the first light guide member and second light guide member being formed in one body.

4. An illuminating apparatus according to claim 2, wherein the first light guide member and second light guide member are separated by a partition, a joint portion for connecting the first and second light guide members together being provided in a position opposed to the region of a dial which is not provided with a portion to be transmission illuminated of the display member.

5. An illuminating apparatus according to claim 1, wherein the reflecting portion has a curved cross-sectional shape.

6. An illuminating apparatus according to claim 1, wherein the reflecting portion has a cross-sectional shape obtained by forming a plurality of flat surfaces continuously at various angles.

* * * * *